United States Patent [19]
Walker et al.

[11] 3,956,164
[45] May 11, 1976

[54] CHELATING AGENTS

[75] Inventors: Jerry Lee Walker; Thomas Edward Cornelius, III, both of Coraopolis, Pa.

[73] Assignee: Calgon Corporation, Pittsburgh, Pa.

[22] Filed: Sept. 23, 1974

[21] Appl. No.: 508,125

[52] U.S. Cl. ............................ 252/180; 210/58; 252/82; 252/546
[51] Int. Cl.² .......................................... C02B 5/06
[58] Field of Search .............. 252/180, 179, 546, 82, 252/DIG. 11; 210/58

[56] References Cited
UNITED STATES PATENTS

| | | | |
|---|---|---|---|
| 2,396,938 | 3/1946 | Bersworth | 210/58 |
| 3,099,521 | 7/1963 | Arensberg | 210/58 |
| 3,151,084 | 9/1964 | Schiltz | 252/546 |
| 3,296,027 | 1/1967 | Jacklin | 252/180 |
| 3,308,065 | 3/1967 | Lesinki | 252/546 |
| 3,527,609 | 9/1970 | Vinso | 210/58 |
| 3,549,538 | 12/1970 | Jacklin | 210/58 |
| 3,666,664 | 5/1972 | Lorenc et al. | 252/180 |
| 3,804,770 | 4/1974 | Lorenc et al. | 210/58 |

OTHER PUBLICATIONS

*Sequestrene*, "Water Treatment," p. 50, 1952, Geigy Industrial Chemicals.

*Primary Examiner*—Mayer Weinblatt
*Assistant Examiner*—Edith R. Buffalow
*Attorney, Agent, or Firm*—Rudolph J. Anderson, Jr.; Harry E. Westlake; Martin L. Katz

[57] ABSTRACT

Combination of ethylenediaminetetraacetic acid and nitrilotriacetic acid or water soluble salts thereof for the removal and prevention of scale in steam generators.

8 Claims, No Drawings

CHELATING AGENTS

INTRODUCTION

Even high purity, treated waters such as those produced by sodium zeolite and demineralization ion exchange units contain trace concentrations of alkaline earth metal ions, particularly calcium and magnesium, that will cause serious problems on the heat transfer surfaces of steam generators which produce steam from that water. The alkaline earth metal ions will precipitate as hard scale onto the heat transfer surfaces as solubility products of the alkaline earth metal ions and naturally occurring precipitating anions in the boiler water are exceeded due to increase in the water temperature and to the increase in ions' concentrations caused by the concentration effect of evaporation from the steam generator. Failure to prevent this scale formation will result in overheating of the heat transfer surfaces due to the heat insulating effect of the scale and will ultimately result in burn-out of the metal surfaces separating the boiler water from the heat source. Such burn-outs can be hazardous to operating personnel, will necessitate expensive repairs, and will cause cessation of steam production and, therefore, will cause shut-down of the process for which the steam is needed.

One method of reducing or eliminating this scale is to reduce the effective concentration of the cation by its formation of a soluble chelate. It has long been known, as set forth by U.S. Pat. No. 2,240,957, that compounds such as the alkali metal salts of:

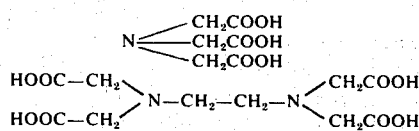

commonly referred to as nitrilotriacetic acid and ethylenediaminetetraacetic acid, respectively, are suitable for treating hard water to prevent precipitation. However, as discussed in U.S. Pat. No. 2,396,938, it was found that such suitability was no criterion whatsoever of the applicability of those compounds in treating boilers. U.S. Pat. No. 2,396,938 teaches the use of an alkaline polyamine polyacetic acid such as ethylenediaminetetraacetic acid and a water-soluble alkaline reacting compound such as alkali metal hydroxides whereby boiler water metal surfaces are cleaned and kept clean by the feed of those two substances to the boiler feedwater. This patent required that the polyamine polyacetic compound must have a minimum of four CH₂COOH groups to be effective in his invention.

U.S. Pat. No. 3,296,027 teaches the use of nitrilotricarboxylic acids and their salts such as trisodium nitrilotriacetic acid, for the removal and prevention of scale in boilers.

U.S. Pat. No. 3,520,813 teaches the use of an adsorbent such as the natural dispersives, a precipitating agent such as phosphate, and a weak acid having dissociation constants between 3 and 8, such as nitrilotriacetic acid or ethylenediaminetetraacetic acid for the removal or prevention of scale in boilers. This patent teaches that these weak acids will not prevent precipitation of calcium or magnesium salts in the presence of certain precipitating agents such as phosphate if the precipitating agent is present in sufficient concentration.

U.S. Pat. No. 3,666,664 teaches the prevention of boiler scale through the feed of a composition containing a synergistic blend of nitrilotriacetic acid and a specific or ganophosphate compound whereby scale prevention when the nitrilotriacetic acid is present at concentrations less than stoichiometric to the hardness cations is augmented through the additional use of the specific organophosphate. U.S. Pat. No. 3,804,770 similarly teaches the use of a specific organophosphonate and ethylenediaminetetraacetic acid for the prevention of scale in steam generators.

Effective use of chelating agents to remove and prevent scale formation in operating boilers requires that the chelating agent form a sufficiently tight chelate so as to successfully compete with the existing precipitating anions such as carbonate or hydroxide, that the chelating agent forms chelates that are sufficiently stable at high temperature to prevent decomposition, that the chelating agent be capable of existing as the free anion at high temperatures in concentration sufficient to maintain a reservoir of excess chelating agent in the boiler water, and that the excess chelating agent can be easily and accurately determined as a means of control and monitoring.

We have discovered that these requirements for the effective use of chelating agents in the prevention and removal of scale from the metal surfaces contacted by boiler water can be achieved through the use of a composition consisting essentially of a blend of ethylenediaminetetraacetic acid and nitrilotriacetic acid in a manner superior to that resulting through the treatment with nitrilotriacetic acid or ethylenediaminetetraacetic acid when used separately.

OBJECT

It is, therefore, an object of this invention to provide an improved method whereby scale can be removed or prevented in the water circuit of steam generators.

It is a further object to provide new and novel compositions for the removal and prevention of scale and sludge in the water circuit of steam generators.

It is still a further object to provide methods and compositions for scale and sludge prevention utilizing chelating agents in a special blend best suited for the prevention of calcium or magnesium precipitation in the presence of competing anions.

It is another object of this invention to provide methods and compositions for the prevention of scale whereby the calcium and magnesium chelates thus formed exhibit sufficiently high hydrolytic thermal stability to remain stable even at the high temperatures encountered in boiler waters.

It is a further object of this invention to provide methods and compositions for the prevention of scale and sludge whereby the excess chelating agent exhibits sufficient hydrolytic thermal stability to remain stable even at the high temperatures normally encountered in boiler waters.

It is a still further object of this invention to provide methods and compositions for the prevention of scale and sludge whereby the treating composition can be controlled on the basis of simple testing of the boiler water for the presence of excess chelating agent.

It is a further object of this invention to provide a composition for prevention and removal of boiler deposits whereby the more economical nitrilotriacetic acid chelating agent can be used to take the utmost advantage of its lower cost by augmenting the utility of the nitrilotriacetic acid through the additional incorporation of ethylenediaminetetraacetic acid into the composition.

THE INVENTION

This invention relates to the method and composition for the prevention and removal of scale or sludge from the water circuit of steam boilers through the feed of a composition consisting essentially of a blend of nitrilotriacetic acid and ethylenediaminetetraacetic acid present in stoichiometric ratios of one to another ranging from 0.05:0.95 to 0.95:0.05. The trisodium salt of nitrilotriacetic acid and the tetra-sodium salt of ethylenediaminetetraacetic acid are most generally used and are hereinafter referred to as NTA and EDTA.

These two chelating agents, as discussed in the above introduction, have been widely used separately or with specific precipitating agents or organophosphonates for the prevention of scale of sludge in steam generators. Prior to the use of chelating agents, boiler water treatment methods consisted essentially of deliberately precipitating the alkaline earth cations, magnesium and calcuim, as magnesium silicate and calcium phosphate. These precipitates, while reducing heat transfer and ultimately resulting in tube burn-out due to inadequate cooling of the metal surface caused by water starvation of the water circulating tubes, were far less deleterious than the magnesium hydroxide, calcium carbonate, or calcium sulfate that would otherwise form. EDTA or NTA offered the theoretical advantage of completely eliminating even the less deleterious sludge through the mechanism of the formation of water-soluble chelates of the alkaline earth metals, thus blocking their precipitation onto the heat transfer surfaces. However, such treatments have been found inadequate in many cases. In the case of EDTA, it has been found that excess EDTA has very poor hydrolytic, thermal stability. This shortcoming results in the inability to maintain a reservoir of excess EDTA in the boiler water which can then result in serious scale formation in the boiler if the boiler feedwater hardness content increases due to condensate contamination or malfunction of the pretreatment equipment. Furthermore, this poor thermal, hydrolytic stability of EDTA does not allow for an adequate control test by which the EDTA feed rate can be adjusted.

NTA, on the other hand, forms much weaker chelates than does EDTA. In order to thoroughly understand this art, one must continuously be aware that the chelation reactions are equilibrium reactions in which the soluble metal chelate is in equilibrium with the non-reacted metal ion. Thus, in the case of calcium and magnesium chelates, there is always present in equilibrium with the chelate a portion of non-chelated calcium or magnesium that could potentially precipitate in the boiler. Whether or not precipitation takes place depends on the concentration of the non-chelated calcium or magnesium, the concentration and type of precipitation anions present, and the solubility of the potential precipitate at the water temperatures encountered. The concentration of non-chelated hardness ion, on the other hand, is a function of the concentration of the metal-chelate, of the excess chelating agent, and of the stability constant of the metal-chelate at the water temperatures being encountered. This stability constant is the equilibrium constant of the chelation reaction and is normally presented as the log to the base 10 of the equilbrium constant. The chelation reaction will move toward formation of the metal-chelate; that is, will form a tighter chelate as the stability constant increases. Since the stability constants of NTA are considerably lower than those for EDTA, NTA treatment of boiler water can be expected to result in a greater precipitation of highly insoluble substances such as calcium phosphate and magnesium silicate than with EDTA treatment. However, this has not been found to be the case in many systems. Since the concentration of the nonchelated cation is a function of the concentration of the excess chelating agent as well as the stability constant, the greater hydrolytic, thermal stability of NTA over EDTA results in the capability of maintaining a larger excess of chelating agent and, therefor, a reduction in the concentration of non-chelated calcium and magnesium.

We have discovered that a composition consisting essentially of a blend of NTA and EDTA results in a superior boiler water treatment method in which the higher stability constants of EDTA are utilized, the poor thermal stability of excess EDTA is minimized, and the higher hydrolytic thermal stability of NTA is effectively utilized to provide a reservoir of excess chelating agent in the boiler water to provide a cushion against increased hardness input and to provide a method by which chemical feed rate can be adjusted.

The composition of this invention was tested against NTA only and EDTA only for the prevention of calcium and magnesium precipitation in a test boiler in a manner as discussed below.

TEST PROCEDURE

The experimental data was obtained by using a test boiler which consists of a 3-inch bottom drum, a single 1-inch riser tube, a 6-inch top drum, and a single 1-inch downcomer which circulates water to the bottom drum through a circulating pump and rotameter. The heat source is a 4.6 KW cartridge heater inserted through a thimble tube into the bottom drum and four, 2.5 KW cartridge heaters cast into a heating block clamped to the riser tube so that heat input is to only one side of the generating tube.

The total steam generated is condensed and returned to a condensate receiver. Make-up is distilled water to which has been added the required amount of calcium or magnesium salt. Feedwater from the preheater consists of automatically proportioned condensate, make-up water, and a chemical feed solution which contains sodium sulfite. Feedwater is pumped continuously to the top drum by a first boiler feed pump whereas a second pump is operated intermittently to maintain the desired water level. A second chemical solution, which contains the inhibitor composition, is injected every 10 minutes to the boiler feedwater line. Blowdown from the top drum is through a solenoid valve which opens every 10 minutes. All streams are carefully measured volumetrically so that accurate material balances can be maintained continuously.

The boiler was operated at 200 psi. during these test runs and the boiler circulating pump rate was 0.6 gpm. We calculated the theoretical concentrations in the boiler water based on the known flow rates and stream concentrations. The calcium and magnesium in the blowdown water was then determined by atomic absorption analysis.

It is then a simple matter to compare the concentration found in the blowdown water to that fed to the boiler and thus determine the degree of scale prevention.

EXAMPLE 1

In three separate test runs, the ability of NTA, EDTA, and a composition consisting of stoichiometrically equal concentrations of EDTA and NTA were evaluated to determine their ability to prevent the precipitation of calcium phosphate and the degree to which they could be controlled on the basis of boiler water testing for the excess chelating agent. In this example and hereinafter all specific concentrations will be presented as their molar equivalences as mg/l as $CaCO_3$. This is common practice in the art and is particularly useful in dealing with chelation reactions as any such treatments should be compared to stoichiometrically equal basis. In this example, calcium phosphate scale was prevented to the extent as shown in the following table:

| Treatment | % Scale Inhibition per ppm as $CaCO_3$ of Product |
|---|---|
| 1. NTA | 0.20 |
| 2. EDTA | 0.77 |
| 3. Composition 1 (Equal blend of NTA and EDTA) | 0.54 |

Average $PO_4$ in boiler during tests — 11 ppm (as $CaCO_3$)
Total calcium input in boiler — 43 ppm (as $CaCO_3$)

During the test runs, the excess chelating agent concentrations in the boiler water were determined by conventional test methods. During the NTA test, the excess NTA determination agreed very well with theoretical. During the EDTA run, the excess EDTA was much less than theoretical and at times was indicated to be zero. The run with Composition 1 resulted in excess chelating agent test results in good agreement to theoretical. Thus, the composition 1 reflects the higher stability value of EDTA while maintaining the higher thermal stability of NTA. In addition, the scale prevention capability of the more economical NTA has been augmented by incorporation of the EDTA.

Although the above example clearly reflects improved scale prevention from NTA through the incorporation of EDTA, it is difficult to expand the results of any specific test run to the total art because of the many controlling variables as discussed earlier. A methematical method was therefore derived from which the empirical data could be expanded to predict the degree of scale prevention under any given set of conditions. The method for doing this was to determine the "stability value" of the product from data established during the boiler test runs.

Stability value is defined as follows:

$$\text{"Stability Value"} = SV = \frac{1}{a_o[A]}$$

where $a_o$ is the free metal ion, as determined from the "apparent solubility products" and known concentrations of precipitating anions divided by the concentration of metal found by atomic absorption in the boiler blowdown water, and $[A]$ is the excess chelating agent in the boiler water. All units are in gram-mole per liter.

The log of the stability values determined from these calculations for the three products, NTA, EDTA, and Composition 1, from equilibrium conditions existing in the phosphate/calcium test runs of Example 1 are as follow:

| | |
|---|---|
| NTA | 8.5 |
| EDTA | 9.3 |
| Composition 1 | 9.1 |

These "stability values" are thus empirical values derived from test boiler runs that can be used to predict product effectiveness under any set of conditions. The stability value is the empirical equivalent of the "stability constant" discussed above and, therefore, reflects the product's relative ability to prevent precipitation. The higher the stability value, the greater is the product's ability to prevent precipitation.

EXAMPLE 2

Test boiler runs were performed as in Example 1 except that the substances were tested for their ability to prevent magnesium silicate deposits. The boiler was operated at 200 psig., the total magnesium input to the boiler water was 43 mg/l, and the average silica concentration was 175 mg/l (~11 units as $CaCO_3$). The stability value results from the three boiler test runs were as follow:

| | |
|---|---|
| NTA | 7.1 |
| EDTA | 8.2 |
| Composition 1 | 7.8 |

Thus, it is shown that the NTA of Composition 1 is augmented by the incorporation of EDTA. In addition, the product of Composition 1 was shown to be superior to either NTA or EDTA as the product was more successful than NTA in the prevention of magnesium silicate deposits and more successful than EDTA in its capability of being controlled based on testing of the boiler water.

EXAMPLE 3

Composition 1 was utilized for six months' treatment of a boiler system in the midwest. These boilers had been treated with conventional phosphate methods initially and had developed heavy sludge problems. The boilers were cleaned and then treated in a non-conventional manner using organic sequestering agents of the aminophosphonate type. That treatment resulted in serious deposits within a few months that necessitated chemical cleaning of the units. The boilers were then treated with a commercial composition based upon NTA. Results were quite superior to any previously obtained results. However, old calcium deposits remained in the boilers and a small amount of magnesium silicate continued to form. Composition 1 of this invention was then employed for six months at feed rates considerably less, on a stoichiometric basis, than had been used with the NTA product. Feed requirements were at theoretical and could be controlled by routine monitoring of the boiler water. Results were excellent. Old deposits were removed at an accelerated rate and no calcium or magnesium deposition took place during the trial.

EXAMPLE 4

Composition 1 was further tested at a chemical production plant. The boiler feedwater consisted essentially of sodium zeolite water and contained 1 mg/1 or less of hardness. When on conventional phosphate treatment, heavy sludge deposits caused overheating and failure of boiler tubes. Treatment with a commercial NTA product provided improved results but removal of old calcium phosphate deposits was not being accomplished and small amounts of magnesium silicate continued to form. Treatment after four months with the composition of this invention resulted in accelerated cleaning of the calcium phosphate deposits and eliminated the deposition of magnesium silicate. In addition, feed requirements were at theoretical and feed rates were controllable by routine monitoring of the boiler feedwater for excess chelating agent.

While the compositions discussed in the test boiler runs and in the field examples above consisted essentially of equal stoichiometric concentrations of NTA and EDTA, it will be obvious to those skilled in the art that many other ratios of NTA to EDTA will also have utility in many specific instances. The 1:1 ratio was selected as the composition of choice because it is the best compromise ratio for application to boiler waters of many variations. Stoichiometric treatment of boiler waters with chelating agents requires that the chelating agents be fed in sufficient concentration, the chelate, the potential precipitating cation, and an excess to that amount sufficient to establish and maintain a reserve of excess chelating agent in the boiler water to provide a monitoring and control mechanism as well as reserve chelating power to protect against precipitation caused by unexpected hardness increases. In industrial boiler water systems, the ratio of chelating agent required for stoichiometric reaction with precipitating cations to that required for establishment of the boiler water reserve varies from 0.05:0.95 to 0.95:0.05. The ideal ratio of EDTA to NTA would, therefore, also vary within these same ratios as it is obviously desirable to have a higher ratio of EDTA to NTA in those cases where the ratio of cations to be chelated to the amount needed for reserve is higher so as to take optimal advantage of the higher stability values of EDTA. However, when the reverse is true, a higher ratio of NTA:EDTA is more desirable so as to take advantage of the greater hydrolytic, thermal stability of NTA and, therefore, its superiority in providing a reservoir of chelating power for purposes of monitoring and control and as a margin against unexpected increases in hardness inputs. To demonstrate this effect, products of the following compositions were prepared:

| Product | Mole % NTA | Mole % EDTA |
|---|---|---|
| Composition 2 | 90 | 10 |
| Composition 3 | 75 | 25 |
| Composition 1 | 50 | 50 |
| Composition 4 | 25 | 75 |
| Composition 5 | 10 | 90 |

Each of the above compositions was then reacted with calcium to an extent equal to 90 percent of the total chelating power of the products. Standard titration tests for excess EDTA and for excess NTA were then run on the reacted products Results were as follow:

| Product | Molar % Excess NTA | Molar % Excess EDTA |
|---|---|---|
| Composition 1 | 8 | 1.5 |
| Composition 2 | 9 | 1.6 |
| Composition 3 | 11 | 2.0 |
| Composition 4 | 11 | 2.0 |
| Composition 5 | 11 | 4.5 |

In the above example, the total excess chelating agent in each case is 10 percent of the total chelant's concentration. While the ratio of NTA to EDTA varies from 9:1 to 1:9. Regardless of the ratio of NTA to EDTA, determination for excess NTA is near the 10 percent level. On the other hand, excess EDTA is consistently low regardless of the EDTA to NTA ratio.

We have thus shown that a superior method of boiler water treatment can be achieved through the use of compositions consisting of blends of NTA and EDTA. This blend has been shown to be synergistic in that use of these two substances results in superior boiler water treatment due to augmentation of the more economical and thermally stable NTA by the higher stability value EDTA. These superior results do not merely reflect the additive effect of two separate chelating agents but rather represent a new and superior method of boiler water treatment not previously known to the art.

It is obvious that compositions of this invention can be further compounded with other boiler water treatment substances such as defoamers and dispersives without detracting from or negating the essential novelty of this invention.

We claim:

1. The method of preventing and removing deposits from the metal surfaces of the aqueous circuit of steam generators by adding to the circulating water or to the feedwater an effective amount of a composition consisting essentially of a blend of approximately a 1:1 molar ratio of nitrilotriacetic acid and ethylenediaminetetraacetic acid.

2. The method of claim 1 in which the nitrilotriacetic acid and ethylenediaminetetraacetic acid are present as the sodium salts.

3. The method of claim 2 in which the composition also contains dispersing agent in a concentration sufficient to result in from 1 to 100 mg/1 of dispersive in the boiler water.

4. The method of claim 2 in which the composition also contains an antifoam in a concentration sufficient to result in from 1 to 100 mg/1 of antifoam in the boiler water.

5. The composition of claim 8 in which the nitrilotriacetic acid and ethylenediaminetetraacetic acid are present as the sodium salts.

6. The composition of claim 5 in which the composition also contains a dispersing agent in a concentration sufficient to result in from 1 to 100 mg/1 of dispersive in the boiler water.

7. The composition of claim 5 in which the composition also contains an antifoam in a concentration sufficient to result in from 1 to 100 mg/1 of antifoam in the boiler water.

8. A scale preventive composition consisting essentially of a blend of nitrilotriacetic acid and ethylenediaminetetraacetic acid wherein the molar ratio of nitrilotriacetic acid to ethylenediaminetetraacetic acid is approximately 1:1.

* * * * *

UNITED STATES PATENT AND TRADEMARK OFFICE
CERTIFICATE OF CORRECTION

PATENT NO. : 3,956,164
DATED : May 11, 1976
INVENTOR(S) : Jerry Lee Walker and Thomas Edward Cornelius III It is certified that error appears in the above-identified patent and that said Letters Patent are hereby corrected as shown below:

Column 5, Line 41 "composition" should read -- Composition --.

Column 7, Line 68 after "products" insert -- . --.

Column 8, Line 23 insert quotation marks before and after the words "stability value".

Claims 5 through 8 should read as follows:

5. A scale preventive composition consisting essentially of a blend of nitrilotriacetic acid and ethylenediaminetetraacetic acid wherein the molar ratio of nitrilotriacetic acid to ethylenediaminetetraacetic acid is approximately 1:1.

6. The composition of claim 5 in which the nitrilotriacetic acid and ethylenediaminetetraacetic acid are present as the sodium salts.

7. The composition of claim 6 in which the composition also contains a dispersing agent in a concentration sufficient to result in from 1 to 100 mg/l of dispersive in the boiler water.

8. The composition of claim 6 in which the composition also contains an antifoam in a concentration sufficient to result in from 1 to 100 mg/l of antifoam in the boiler water.

Signed and Sealed this

Eleventh Day of January 1977

[SEAL]

Attest:

RUTH C. MASON
*Attesting Officer*

C. MARSHALL DANN
*Commissioner of Patents and Trademarks*